United States Patent
Gillard-Hickman (10) Patent No.: US 6,653,588 B1
(45) Date of Patent: Nov. 25, 2003

(54) AUTO REJECT UNIT (75) Inventor: Douglas Roy Gillard-Hickman, East Sussex (GB)

(73) Assignee: Rapiscan Security Products Limited, West Sussex (GB)

(*) Notice: Subject to any disclaimer, the term of this patent is extended or adjusted under 35 U.S.C. 154(b) by 0 days.

(21) Appl. No.: 09/166,613

(22) Filed: Oct. 5, 1998

(30) Foreign Application Priority Data

May 5, 1998 (GB) ................................................ 9809557

(51) Int. Cl.[7] .............................. B07C 5/00; B65G 29/00
(52) U.S. Cl. ...................... 209/589; 209/919; 209/939; 198/369.4; 198/414
(58) Field of Search ............................... 209/552, 559, 209/562, 563, 564, 589, 919, 654, 939; 198/369.4, 782, 414

(56) References Cited

U.S. PATENT DOCUMENTS

| | | | | |
|---|---|---|---|---|
| 3,100,039 A | * | 8/1963 | Oderman et al. | 198/369.4 X |
| 3,789,519 A | | 2/1974 | Montgomery et al. | 35/19 R |
| 3,797,131 A | | 3/1974 | Orfei et al. | 35/19 R |
| 3,898,433 A | | 8/1975 | Sallet | 235/61.11 R |
| 4,029,963 A | | 6/1977 | Alvarez et al. | 250/360 |
| 4,154,672 A | * | 5/1979 | Wiley et al. | 209/589 X |
| 4,383,327 A | | 5/1983 | Kruger | 378/19 |
| 4,422,177 A | | 12/1983 | Mastronardi et al. | 378/17 |
| 4,618,341 A | * | 10/1986 | Oldham et al. | 198/414 X |
| 4,879,735 A | | 11/1989 | Owens | 378/57 |
| 5,156,279 A | * | 10/1992 | Draghetti | 209/919 |
| 5,483,569 A | | 1/1996 | Annis | 378/87 |
| 5,642,393 A | | 6/1997 | Krug et al. | 387/57 |
| 5,699,400 A | | 12/1997 | Lee et al. | 378/57 |
| 5,794,788 A | * | 8/1998 | Massen | 209/589 |
| 6,094,472 A | | 7/2000 | Smith | 378/86 |

FOREIGN PATENT DOCUMENTS

| | | | |
|---|---|---|---|
| DE | 3830194 A1 | 3/1990 | |
| DE | 295 11 788 U1 | 10/1995 | |
| DE | 297 21 767 U1 | 5/1999 | |
| GB | 1255939 | 12/1971 | |
| GB | 1396545 | 6/1975 | |
| JP | 07/277494 | 10/1995 | |
| SU | 508452 | * 3/1976 | 198/369.4 |
| SU | 607766 | * 5/1978 | 198/369.4 |

* cited by examiner

*Primary Examiner*—Tuan N. Nguyen
(74) *Attorney, Agent, or Firm*—Thelen Reid & Priest LLP; David B. Ritchie (57) ABSTRACT

An auto reject unit includes a turntable rotatable about an upright axis and held stationary in operation along the upright axis. Driven rollers are mounted upon the turntable for selectively driving an article across the turntable in a direction. A motor is disposed to rotate the turntable about the upright axis in response to a command. The rotation adjusts the direction that an article disposed on the turntable will travel off of the turntable.

46 Claims, 6 Drawing Sheets

AUTO REJECT UNIT

BACKGROUND OF THE INVENTION

This invention relates to a sorting apparatus for sorting articles, such as items of baggage, on a conveyor.

X-ray systems for monitoring baggage are frequently installed in airports, government buildings and other places where security is important.

Such systems traditionally comprise a conveyor belt which passes through an X-ray scanner under the control of an operator. Baggage to be checked is loaded onto the conveyor belt, and passes into the X-ray scanner. Here, the baggage is irradiated with X-rays and a screen associated with the scanner shows the contents of the baggage to the operator.

The baggage passes out the other side of the scanner on the moving conveyor belt, and onto a set of freely rotatable rollers, called "lazy rollers", adjacent to the conveyor belt. These rollers are typically mounted on a slight downward slope, so that the baggage is carried away from the moving conveyor belt. The baggage comes to rest in a collection area at the downward end of the rollers.

If the operator notes something suspicious in an item of baggage as it passes through the scanner on the conveyor belt, then the belt may be stopped whilst the item is still in the scanner. This permits the resultant stationary image on the screen to be inspected more closely.

If the operator then decides that the item must be investigated manually, an alarm is raised. This prompts another person to remove the item from the belt to a separate search area for opening and searching. Alternatively, random manual double-checks may be carried out on every one in ten, for example, items of baggage that are X-rayed.

In most situations it is important that the rate of examination of the baggage is as high as possible, to avoid delays. Clearly, items of baggage identified from manual inspection cannot be inspected in the collection area, as this will impede the retrieval of items of baggage which do not need to be manually inspected. Therefore, when an item has been identified for manual inspection, it must be lifted off the collection area (at the downward end of the rollers), and carried to a separate table. In order to maximize baggage throughput with this system, three operating personnel are therefore required, one to view the screen and identify items of baggage for manual inspection, one to remove such items from the collection area and place them on a separate table, and one to open the items on that table and manually search them. The weight of some items of baggage can create a health and safety problem for the person who is required to lift and carry such items from the collection area to the separate table.

In an alternative arrangement, a continuously moving conveyor belt has a chute arranged perpendicular to the belt. An extendable arm is located opposite the chute on the other side of the belt. When an object such as an item of baggage is identified to be removed from the belt, the arm extends rapidly transverse to the belt, pushing the chosen item down the chute. The arm then retracts back again.

The belt may move more rapidly in this alternative arrangement, thereby permitting a much more rapid rate of examination of baggage. However, the arm must equally extend and retract relatively rapidly, in order to avoid accidentally knocking adjacent bags as they move along the conveyor belt. The rapid reciprocating movement of the arm creates a substantial impulse on an item of baggage. Thus, the latter arrangement is wholly unsuitable for open or non-rigid baggage.

It is an object of the present invention to alleviate these problems with the prior art.

SUMMARY OF THE INVENTION

These and many other objects and advantages of the present invention will become apparent to those of ordinary skill in the art from a consideration of the drawings and ensuing description of the invention.

According to a first aspect of the present invention, there is provided an apparatus comprising:

a turntable;

driving means for selectively driving an article across the turntable;

and a motor arranged to rotate the turntable in response to a command, such that the article may be driven off the turntable by the driving means in one of a plurality of chosen directions.

The articles may thus be sorted into a plurality of directions, and moved off the turntable for instance into separate channels or onto separate platforms arranged adjacent the turntable in the various chosen directions. No manual input is required.

Preferably, the driving means includes at least one driven roller, and most preferably a plurality of driven rollers, mounted upon the turntable.

Preferably, the apparatus is controlled by a controller for receiving the command and sending a start motor signal to the motor to cause said motor to rotate the turntable. For example, the command may be user input in response to a particular property of the article, such as its contents, which may in turn be determined by X-ray examination of the articles.

The controller may also send a stop driving means signal to the driving means to stop said driving means as the turntable rotates. This prevents the article on the turntable from being ejected whilst the latter rotates.

According to a second aspect of the present invention, there is provided an apparatus for sorting baggage, comprising:

a conveyor for conveying baggage from a first end to a second end thereof;

a turntable, arranged adjacent the second end of the conveyor to receive the baggage therefrom;

driving means for driving the baggage across the turntable; and a motor for rotating the turntable between first and second angular positions in response to a command, such that the baggage may either be moved off the turntable by the driving means and onto a first member arranged in the first angular direction or off the turntable by the driving means and onto a second member in the second angular direction.

Baggage which does not need to be manually inspected, for example, is moved onto a first member, such as a first bench, from where the baggage can be collected by its owner. Baggage which is to be opened and searched, for example will however be moved onto a second member, such as a second bench, suitably perpendicular to the first member. No lifting and carrying of the baggage is necessary which reduces the number of apparatus operators necessary and also reduces health and safety risks.

The invention also extends to a method of sorting articles comprising:

conveying a plurality of articles to a turntable;

and separating the plurality of articles by conveying a first quantity of articles to a first member through rotation of the turntable through a first angle, and driving each article onto the said first member, and by conveying a second plurality of articles to a second member through rotation of the turntable through a second angle, and driving each article onto the said second member.

BRIEF DESCRIPTION OF THE DRAWINGS

The invention may be put into practice in a number of ways, one of which will now be described with reference to the following Figures, in which.

DESCRIPTION OF THE PREFERRED EMBODIMENTS

Those of ordinary skill in the art will realize that the following description of the present invention is not intended to be in any way limiting. Other embodiments of the invention will readily suggest themselves to such skilled persons from an examination of the within disclosure.

Figure 1:
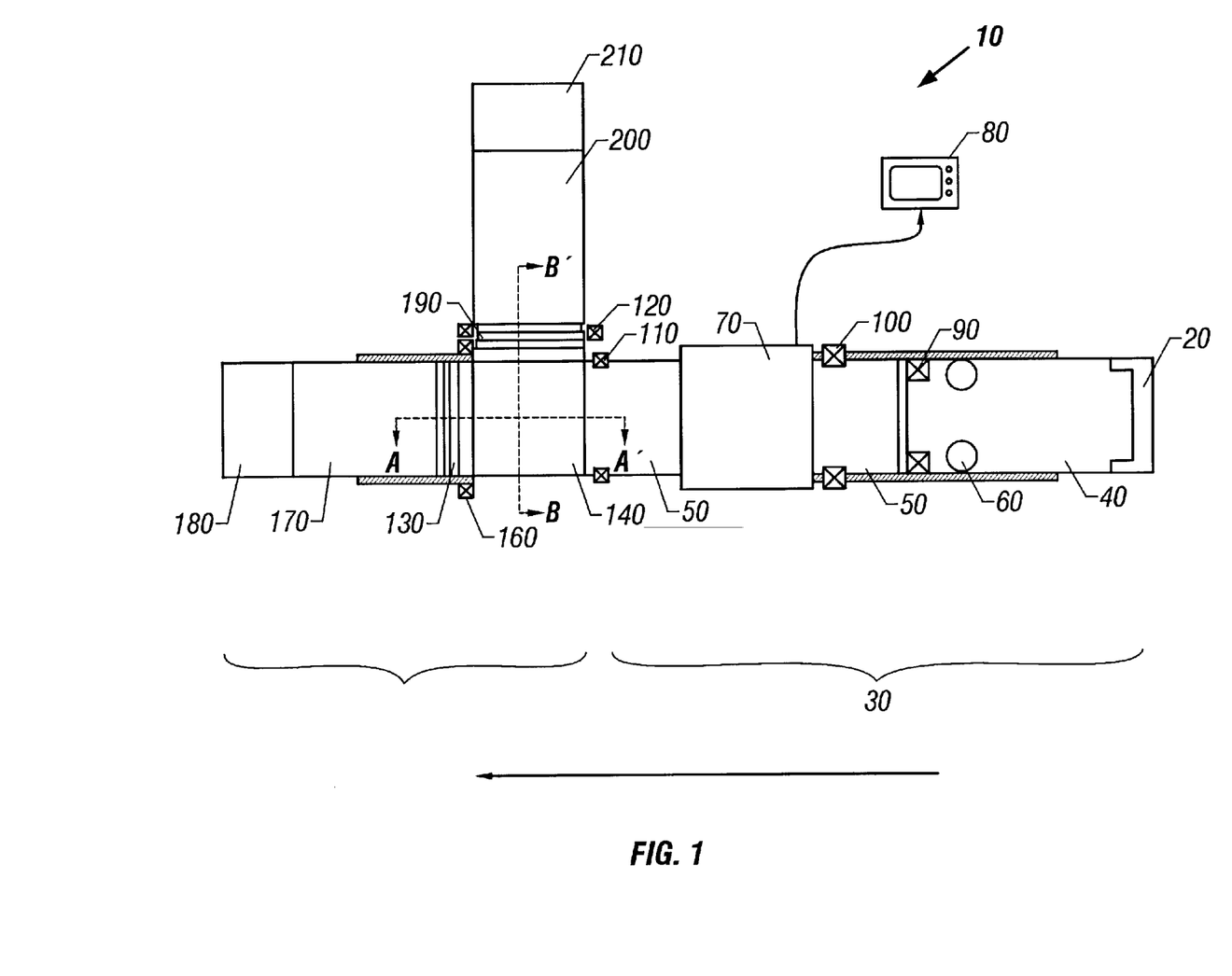
FIG. 1 shows a plan view of one embodiment of the present invention.
Figure 2:
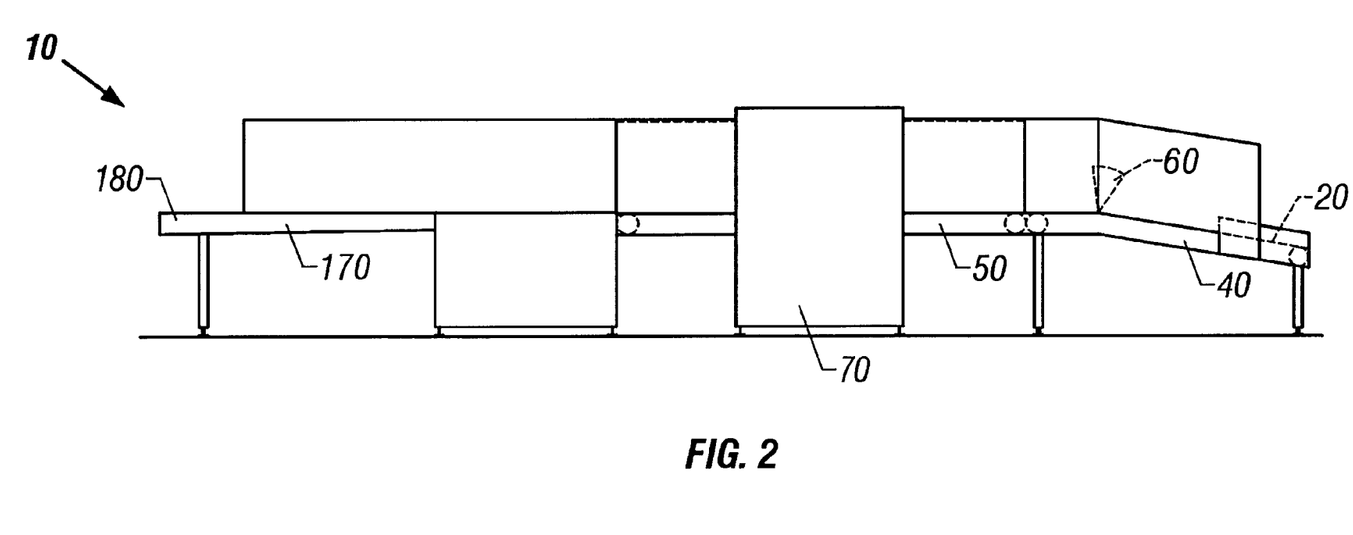
FIG. 2 shows a side view of the embodiment of FIG. 1.

Referring first to FIGS. 1 and 2, a baggage X-ray system 10, including an automatic baggage handler, is shown. The system 10 includes an input unit 20 at a first end of a conveyor belt system shown generally at 30. The input unit receives items of baggage to be X-rayed.

The conveyor belt system comprises a first conveyor belt 40, and a second conveyor belt 50. The first conveyor belt 40 is selectively arrestable, as will be described below, and thus acts to queue items of baggage placed in the input unit 20 onto the second conveyor belt 50. This permits items of baggage to be moved onto the second conveyor belt 50 with a predetermined space between them, regardless of how closely packed the items of baggage are on the first conveyor belt 40.

The system also includes two baggage guides 60, which are mounted upon a frame (not shown) adjacent to the first conveyor belt. As may be seen from FIG. 2, these baggage guides 60 are generally conical and are freely rotatable about a vertical axis. Thus, the baggage guides 60 force items of baggage into the centre of the conveyor belt system 30 regardless of where in the input unit the items are placed.

A first item of baggage is carried along the first conveyor belt 40 and onto the second conveyor belt 50. The second conveyor belt 50 in turn carries the item of baggage into an X-ray unit 70, to which is connected a screen 80. As the first item of baggage passes through the X-ray unit 70, an image of the contents of the item of baggage is displayed upon the screen 80.

The Civil Aviation Authority Guidelines of the United Kingdom for example require each item of baggage to be monitored for at least five seconds. Thus, the first conveyor belt 40 is arranged to queue the baggage onto the second conveyor belt 50 with a sufficient gap between each item. Furthermore, the second conveyor belt 50 is, like the first conveyor belt 40, selectively arrestable. If the contents of the item of baggage are deemed acceptable to a person monitoring the screen 80, then the second conveyor belt is allowed to continue moving. If, however, the contents of the first item of baggage are considered by the person monitoring the screen 80 to be suspicious, then the second conveyor belt 50 may be stopped whilst that item of baggage is still within the X-ray unit 70. This allows the contents of the first item of baggage to be studied more closely on the screen 80.

Once further investigation on the screen 80 has been completed, the second conveyor belt 50 may be restarted. Thus, the first item of baggage exits the X-ray unit 70, still moving right-to-left as seen in FIGS. 1 and 2.

Meanwhile, further items of baggage are queued onto the second conveyor belt 50 from the first conveyor belt 40. The first conveyor belt 40 is thus continually started and stopped to provide adequate spacing between items of baggage on the second conveyor belt 50. Although this can be done manually, it is preferable to automate baggage queueing, and the way in which this is done will be explained below.

If an item of baggage is considered not to require further, manual investigation, then this item passes along to the end of the second conveyor belt 50 and onto a turntable 140. In a first position, the item of baggage is driven across the surface of the turntable, in a direction parallel to its direction of travel along the conveyor belt system 30. The item then proceeds onto a set of collection bench rollers 160 adjacent to the turntable 140. The collection bench rollers 160 are motor-driven and thus drive the item of baggage onto a collection bench 170. The collection bench 170 has a series of freely rotatable or "lazy" rollers (not shown for clarity), and the momentum imparted to the item of baggage by the collection bench rollers forces the item into a collection area 180 at the end of the collection bench 170.

If the person monitoring the screen 80 considers that an item of baggage does require further, manual investigation, then that person operates an alarm. The alarm includes a klaxon or warning light, which indicates to another person employed to operate the system 10 that an item of baggage must shortly be manually searched. The item continues along the second conveyor belt 50 and onto the turntable 140. The turntable rotates through 90° and drives the item of baggage onto a set of inspection bench rollers 190. The inspection bench rollers 190 are located adjacent to the turntable 140, at a first end of an inspection bench 200. The inspection bench 200 is arranged perpendicular to the direction of travel of the conveyor belt system 30, as may be seen from FIG. 1.

The inspection bench 200 also contains a series of "lazy" rollers (again not shown for clarity) which allow the item of baggage to slide along the inspection bench and into an inspection area 210. Here, the item of baggage may be opened and inspected manually.

Once the item of baggage to be inspected manually has been deposited onto the inspection bench 200, the turntable 140 rotates back through 90° to allow subsequent baggage to be collected from the second conveyor belt 50. If the next item of baggage does not need to be manually inspected, then it is passed to the collection bench rollers 160, as previously described. If however the next item of baggage also needs to be manually inspected, then the turntable rotates through 90° once more to deposit the item onto the inspection bench 200.

Thus, it may be seen that, once baggage has been placed into the input unit 20 at the end of the first conveyor belt 40, no further lifting and carrying is necessary until each item of baggage has been X-rayed and manually inspected if necessary. This reduces health and safety risks, and also reduces the number of personnel required to operate the system 10. Indeed, as the inspection area 210 is arranged proximal to the screen 80, one person can operate the whole system 10 without introducing unacceptable delays. Normally, however, two people would be employed, one to monitor the screen 80 and one manually to inspect items of baggage as required.

Having briefly described the principles of the system 10, the turntable and the manner in which it is controlled will now be described in more detail, with reference to FIGS. 3 to 6.

Figure 3:
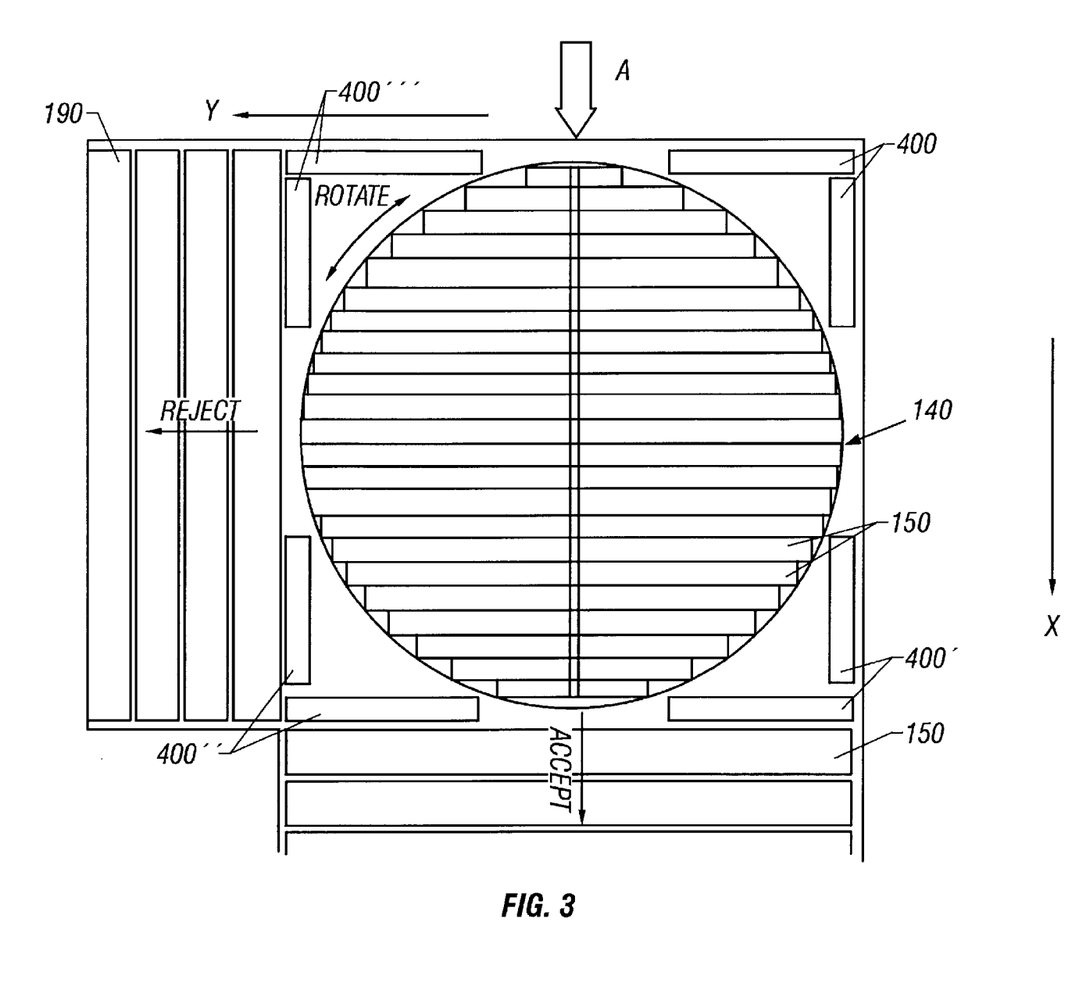
FIG. 3 shows a close-up plan view of a part of the embodiment of FIGS. 1 and 2.

FIG. 3 shows a close-up plan view of the turntable 140, the collection bench rollers 160, and the inspection bench rollers 190. The turntable 140 is generally circular and supports a plurality of turntable rollers 150, whose axes are generally parallel. Each of the turntable rollers 150 is driven by a turntable roller motor 300, which is also supported by the turntable 140. The turntable roller motor 300 drives a shaft 310, and each turntable roller 150 is connected by an associated belt 320 to the shaft 310.

Figure 4:
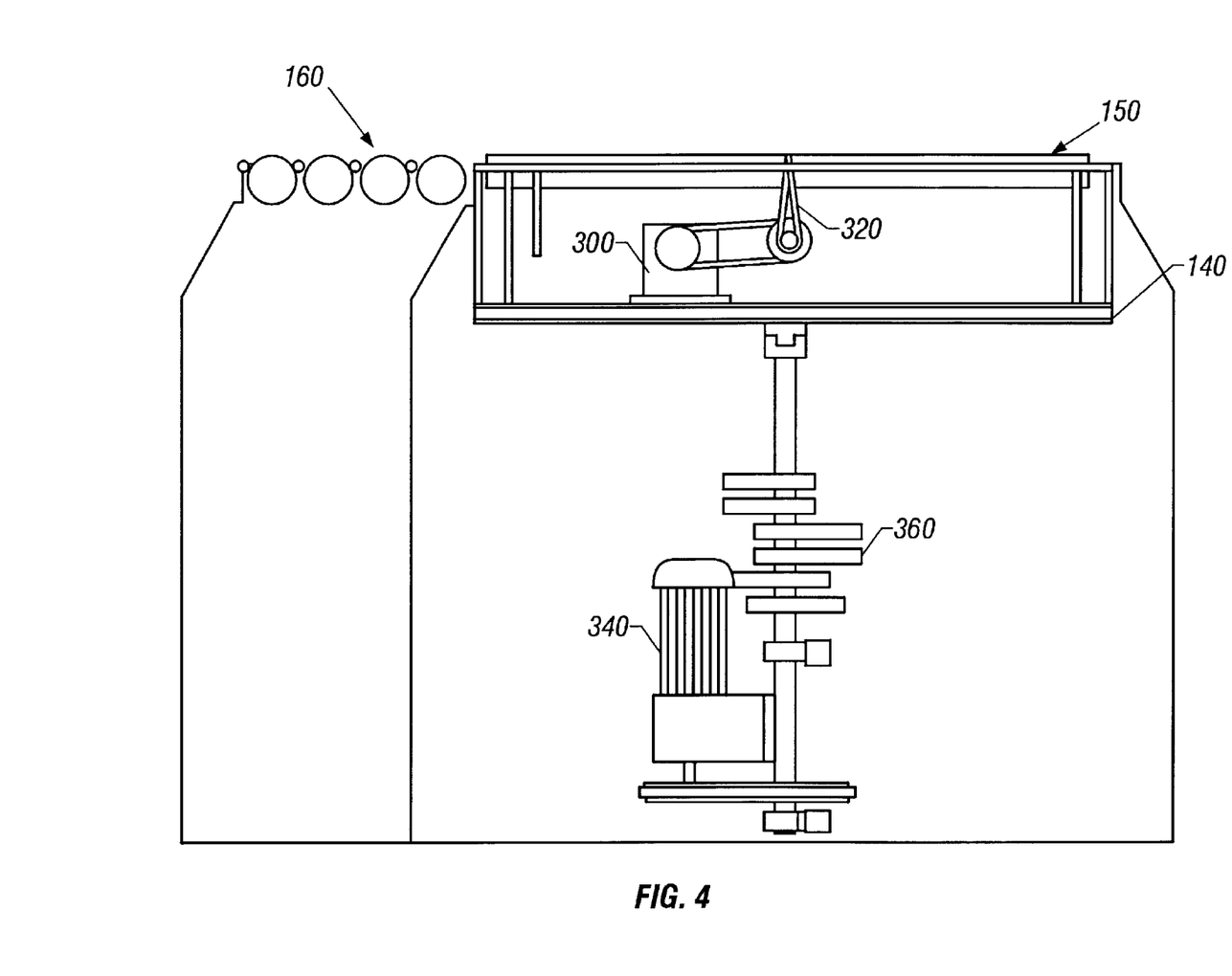
FIG. 4 shows a sectional view through the line A–A' in FIG. 1.
Figure 5:
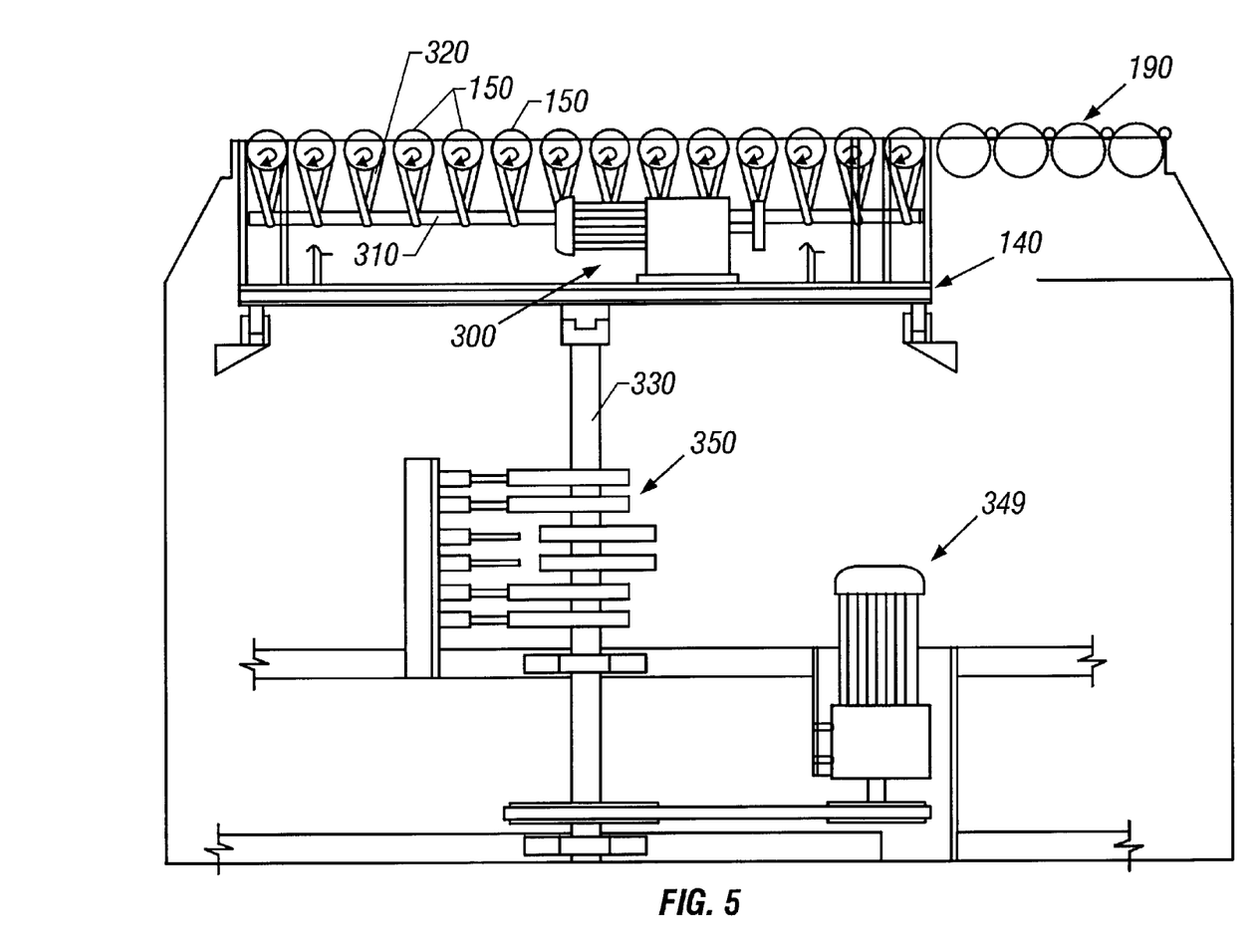
FIG. 5 shows a sectional view through the line B–B' in FIG. 1.

The turntable 140 is mounted upon a spindle 330 which may be rotated by a turntable motor 340. The angular position of the spindle 330, and hence the turntable 140 to which it is attached, is measured by a pair of orthogonal turntable position sensors 350, 360, as shown in FIGS. 4 and 5. The turntable sensors comprise a plurality of cam switches which start and stop the various motors as will be described in further detail below. It will be understood, however, that any suitable angular position transducer may be used.

A plurality of idler rollers 400, 400', 400'' and 400''' are also arranged around the circumference of the turntable 140.

The turntable 140 is initially aligned such that the axes of the rollers 150 are each generally perpendicular to the direction of travel of the conveyor belt system 30, i.e. as shown in FIG. 3. When the person monitoring the screen 80 decides that no further manual investigation of an item of baggage is necessary, that item passes along the second conveyor belt 50 and onto the turntable 140 at the point marked A in FIG. 3. The turntable rollers 150 are each rotated clockwise (see FIG. 5) to pull the item of baggage across the turntable 140 in the direction X (FIG. 3). As the item of baggage reaches the last of the turntable rollers 150, it moves onto the collection bench rollers 160. The collection bench rollers 160 are individually powered by 24 V motors mounted inside each of the rollers 160. A low voltage supply is desirable to avoid the risk of injury if a person's hands gets caught in the collection bench rollers when attempting to remove an item of baggage from there.

As explained previously, the item of baggage moves across the collection bench rollers 160 and onto the series of lazy rollers mounted upon the collection bench 170 (FIG. 1).

On the other hand, when a person monitoring the screen 80 decides that an item of baggage must be investigated manually, an alarm (not shown) is triggered. The item of baggage moves off the end of the second conveyor belt 50 and onto the turntable rollers 150 on the turntable 140. A detector (to be described below), detects when the item of baggage has moved onto the turntable rollers 150, and the turntable roller motor 300 is switched off to prevent the item of baggage from moving further across the turntable rollers 150.

Once the turntable roller motor 300 has been switched off, the turntable motor 340 is activated to rotate the turntable through 90°. Thus, the axes of the turntable rollers become parallel with the direction of movement of the conveyor belt system 30, and perpendicular to the inspection bench 200. The turntable position sensors 350, 360 sense when the turntable has rotated through 90°, the turntable motor 340 is switched off again, and the turntable roller motor is restarted, again driving each turntable roller 150 in a clockwise direction. Thus, the item of baggage is moved off the turntable and onto the inspection bench rollers 190. As with the collection bench rollers 160, each of the inspection bench rollers are individually driven by a low voltage motor.

The item of baggage moves off the driven inspection bench rollers 190 and onto the series of lazy rollers on the inspection bench 200.

As soon as the item of baggage has moved off the turntable and onto the inspection bench rollers, the turntable roller motor 300 is switched off once more. Next, the turntable motor 340 is restarted, to rotate the turntable 140, via the spindle 330, back through 90°. It is preferable that the turntable motor 340 is bi-directional so that the turntable may be rotated either clockwise or counter-clockwise.

Once the turntable position sensors 350, 360 determine that the turntable has rotated back through 90°, the turntable motor 340 stops again. Thus, the axes of the turntable rollers 150 are re-aligned perpendicular to the direction of movement of the conveyor belt system 30.

Provided that the next item to be loaded onto the turntable 140 from the second conveyor belt 150 does not require manual inspection, the turntable roller motor 300 is restarted, and items of baggage pass across the turntable to be collected by the collection bench rollers 160 once more. The turntable roller motor 300 continues to rotate until the next bag to be manually searched moves onto the turntable 140.

In order to prevent items of baggage from being thrown off the turntable through centrifugal force as the turntable rotates, the speed of the turntable motor 340 is ramped up relatively slowly from zero to a constant operating speed. Similarly, the motor is ramped down slowly from the operating speed to zero once more, when the turntable has completed its 90° rotation. Ramping the motor up and down is accomplished by controlling the power to the motor, as will be described in connection with FIG. 6 below. Finally, the turntable motor is braked, for example by energising one of the phases only of the turntable motor, when the turntable motor is switched off.

Although the X-ray system described above can be controlled manually, it is preferable that the system be fully automated. To this end, the system is fitted with a plurality of pairs of photoelectric cells (PECs), which are arranged to detect the position of items of baggage throughout the system. The pairs of PECs are each linked to a central system controller such as a programmable logic controller, which operates the various motors driving the first and second conveyor belts 40, 50, the turntable roller motor 300, and the turntable motor 340.

The location of the various PEC baggage position sensors is shown schematically in FIG. 1.

A first pair of PECs 90 is located at the end of the first conveyor belt 40 distal from the input unit 20. A second pair of PECs 100 is located and the second conveyor belt 50, upstream of the X-ray unit 70. A third pair of PECs 110 is located downstream of the X-ray unit 70, again around the second conveyor belt 50 and adjacent to the turntable 140. Finally, fourth and fifth pairs of PECs 120, 130 are located on opposite sides of the inspection bench rollers 190 and collection bench rollers 160 respectively.

Figure 6:
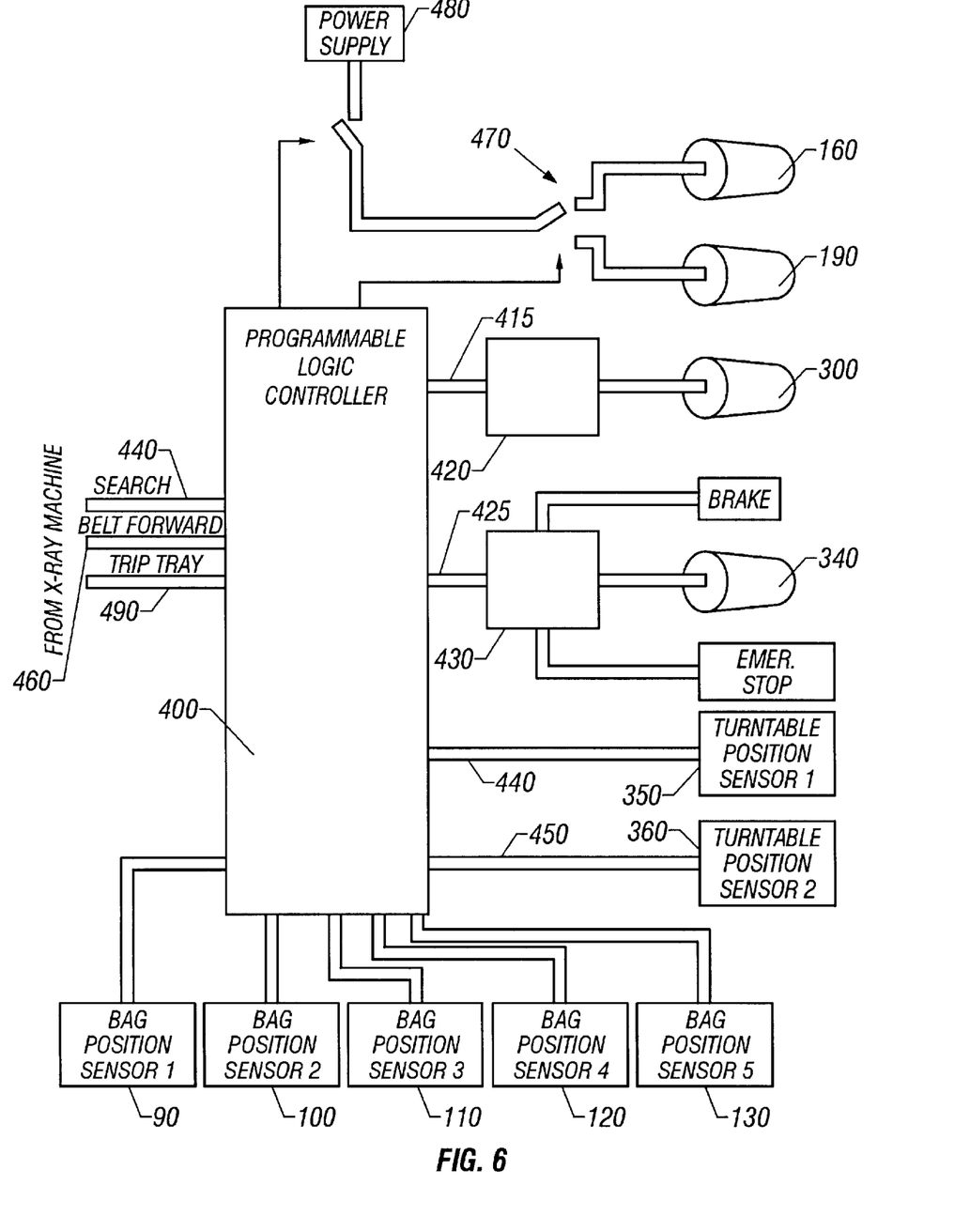
FIG. 6 shows a block diagram of the circuitry to control the embodiment of the invention shown in FIGS. 1 to 5.

Referring now to FIG. 6, a programmable logic controller 400 is shown. The programmable logic controller controls the automated operation of the X-ray system 10 based upon user inputs as well as signals from the pairs of PECs 90, 100, 110, 120, 130 which indicate the position of items of baggage within the system at any time.

A first item of baggage travels along the first conveyor belt 40 and on to the second conveyor 50. As the first item of baggage passes the first pair of PECs 90, a flag is raised in the programmable logic controller 400. The motor driving the first conveyor belt 40 is then stopped when a second item of baggage reaches the first pair of PECs 90.

When the first item of baggage passes between the second pair of PECs 100, the flag in the programmable logic controller is reset, and the motor driving the first conveyor belt 40 is restarted. The procedure continues with third and subsequent items of baggage passing along the first conveyor belt 40. Thus, no matter how closely the items of baggage are placed together in the input unit 20, the items of baggage are suitable separated as they pass through the X-ray unit 70.

The three pairs of PECs 110, 120 and 130 around the turntable 140 co-operate with one another to prevent baggage being forced onto the turntable whilst the turntable is in use. In the case where an item must be manually inspected, a signal is sent to the programmable logic controller 400 by the person monitoring the screen 80. This signal is sent on a search line 410 in FIG. 6. When the programmable logic controller 400 receives a signal on the search line 410, it enters a "wait" state. As the item of baggage identified for search passes between the third pair of PECs 110, the programmable logic controller exits the wait state and commences a "reject baggage" sequence.

In the reject baggage sequence, the controller 400 first sends signals to the first and second motor controllers 420, 430. The first motor controller 420 in turn sends a signal on line 415 to the turntable roller motor 300 to ramp down the power to that motor until the rollers 150 stop rotating. Simultaneously, the programmable logic controller sends a signal on line 425 to the second motor controller 430 to ramp the power up on the turntable motor 340. The programmable logic controller receives inputs along lines 440 and 450 from the two turntable position sensors 350, 360, and sends second signals along the lines 415 and 425 to the first and second motor controllers 420, 430 respectively when the turntable 140 has rotated through the required 90°. The second signals along the lines 415, 425 start the turntable roller motor 300 and stop the turntable motor 340.

As soon as the item of baggage moves off the turntable rollers 150 and onto the inspection bench rollers 190, it passes between the fourth pair of PECs 120. The programmable logic controller receives a signal from the fourth pair of PECs as the item of baggage passes between them. This signal indicates that the turntable is clear of baggage and may commence a "rotate back" sequence, where the turntable 140 is rotated back through 90°. Here, further signals are sent by the programmable logic controller to the first and second motor controllers 420, 430 respectively, to stop the turntable roller motor 300 and start the turntable motor 340 again.

The two turntable position sensors 350, 360 send a signal to the programmable logic controller 400 when the turntable 140 has rotated back to its original position, with the axes of the rollers 150 perpendicular to the direction of travel of the conveyor belt system 30. This allows the turntable roller motor 300 to be started again in dependence upon a signal from the programmable logic controller 400 to the first motor controller 420 along the line 415.

As well as triggering the above "reject baggage" and "rotate back" sequences, activation of the alarm to send a signal along search line 410 also causes the programmable logic controller to send a signal to the motor driving the second conveyor belt 50 (not shown in FIG. 6). As soon as the item of baggage to be inspected passes the third pair of PECs, the second conveyor belt 50 is then stopped to prevent further bags from being carried into the turntable 140 whilst the turntable is in use.

Once the turntable position sensors 350, 360 indicate that the turntable 140 is back in its initial position (with the turntable roller axes perpendicular to the line of travel of the conveyor belt system 30), the programmable logic controller sends a further signal to the motor driving the second conveyor belt 50 to restart it.

The purpose of the fifth pair of PECs 130 is similar to that of the fourth pair of PECs 120. That is, the fifth pair of PECs detects when an item of baggage that does not need to be manually inspected has passed off the turntable and onto the collection bench rollers 170. The programmable logic controller 400 will not send a signal to the turntable motor 340 to rotate it, until a preceding bag has moved fully off the turnable 140, as indicated by the fourth and fifth pairs of PECs.

The third and fifth pairs of PECs also allow the system 10 automatically to handle oversized baggage. Any item of baggage which is longer than the diameter of the turntable 140 is considered oversized. If, having passed through the X-ray unit 70, the person monitoring the screen 80 decides that no further manual investigation is necessary, then the oversized item of baggage simply passes across the turntable 140, over the collection bench rollers 160 and on to the collection bench 170, without difficulty.

However, if the oversized item of baggage requires further manual investigation, then the turntable 140 will need to rotate through 90° once the item has moved onto it. This is not possible with an oversized item of baggage. Therefore, to avoid this situation, which will cause a blockage to subsequent baggage passing along the conveyor belt system 30, the third and fifth pairs of PECs are used. If an item of baggage moves on to the turntable 140, and cuts the light beam of both the third and fifth pairs of PECs simultaneously, then rather than executing the "reject baggage" and "rotate back" sequences explained above, the programmable logic controller instead sends a signal to the motor driving the second conveyor belt 50 to cause it to stop. Simultaneously, the programmable logic controller 400 sends a signal to the screen 80. This prompts the person monitoring the screen to advise the other person who is conducting manual investigation of baggage to remove the oversized item of baggage from the turntable manually.

The collection bench rollers 160 and inspection bench rollers may both rotate continuously. However, it is preferable that the collection bench rollers are stopped when the turntable rotates to move a bag onto the inspection bench, and similarly that the inspection bench rollers are stopped when the turntable is in its initial position to move baggage onto the collection bench. Again, this is carried out under the control of the programmable logic controller 400, which is programmed to send a signal to a switch 470 when the turntable rotation sequence is initiated. In particular, as the programmable logic controller receives a signal on search line 410 to commence the reject baggage sequence, the switch 470 is simultaneously moved from contact with the collection bench rollers 160 to contact to the inspection bench rollers 190. Thus, as the turntable 140 starts to rotate, the collection bench rollers stop rotating and the inspection bench rollers start rotating. Once the item of baggage has been deposited onto the inspection bench, the programmable logic controller 400 sends a second signal to the switch 470 to start the collection bench rollers 160 again whilst stopping the inspection bench rollers 190. This is simultaneous with the commencement of the rotate-back sequence described above.

The whole system may be fitted with a manual override to allow emergency stops of all or part of the system 10. For example, if an item of baggage has a handle or carrying strap which becomes caught in one of the turntable rollers 150, this may be noticed by the person monitoring the screen 80. To prevent damage to the motors and to the item of baggage, an emergency stop button may be depressed. This will send a signal to the programmable logic controller which in turn shuts down all of the system motors immediately. A further automatic shut-off signal is provided along "trip-tray" line 490 to the controller 400. This operates to shut down the conveyor belt motors when a blockage occurs on the belts 40, 50.

In addition to, or as an alternative to manual rejection of items of baggage by pressing an alarm, the programmable logic controller 400 may be programmed to reject every, say, tenth item of baggage automatically. This allows random double checks of baggage to be carried out. Any of the first, second or third pairs of PECs 90, 100, 110 can be used to send a signal to the controller 400 each time an item of baggage passes. The controller 400 counts ten items and then sends a signal on lines 415 and 425 to start the reject baggage sequence.

Whilst the example described above relates to an X-ray system for sorting hand luggage in particular, it will be appreciated that other applications are envisaged, for sorting a wide range of articles. For example, when carrying out X-ray investigation of hold baggage for airlines, the turntable may be fitted with a substantially more powerful motor as hold baggage is generally more rigid and is securely closed. Thus, the conveyor belt system 30 and the turntable 140 can each operate much more quickly.

Furthermore, it is possible to sort canned food by can size. In a system, for such a purpose rather than employing an X-ray unit 70, a size detector would be used instead. The size detector would then send a signal to the turntable such that small cans, for example, are moved off the turntable in one direction, and larger cans in another.

Finally, it will be understood that, whilst only two directions (one parallel and one perpendicular to the direction of travel of the conveyor belt system 30) have been described, articles moving onto the turntable 140 can be moved off it in a large number of directions. For example, the turntable can be stepped in 30° angles from 90° to 270° simply by reprogramming the controller 400. This would allow seven points of exit off the turntable. Thus, multiple selection of articles can be achieved.

ALTERNATIVE EMBODIMENTS

Although illustrative presently preferred embodiments and applications of this invention are shown and described herein, many variations and modifications are possible which remain within the concept, scope, and spirit of the invention, and these variations would become clear to those of ordinary skill in the art after perusal of this application. The invention, therefore, is not to be limited except in the spirit of the appended claims.

What is claimed is:

1. A sorting apparatus comprising:
   a first conveyor conveying an article;
   an x-ray scanner disposed to scan the article;
   a turntable having a diameter, said turntable rotatable about an upright axis among at least a first position and a second position, said turntable receiving the article from said first conveyor;
   a second conveyor conveying the article across the diameter of said turntable;
   an actuator disposed to rotate said turntable about said upright axis in response to a command, said rotation selecting among said at least a first position and a second position so that the article is directed off of said turntable in a direction selected by said command;
   a detector detecting if the article exceeds a selected length; and
   a disabler disabling said first conveyor in response to said detector when said article exceeds the selected length.

2. An apparatus according to claim 1, in which said second conveyor includes at least one driven roller mounted upon the turntable.

3. An apparatus according to claim 1, wherein:
   said first conveyor moves the article onto said turntable.

4. An apparatus according to claim 2, wherein:
   said first conveyer moves the article onto said turntable.

5. An apparatus according to claim 1, further comprising first and second platforms arranged, respectively, adjacent said first and second positions.

6. An apparatus according to claim 2, further comprising first and second platforms arranged, respectively, adjacent said first and second positions.

7. An apparatus according to claim 3, further comprising first and second platforms arranged, respectively, adjacent said first and second positions.

8. An apparatus according to claim 4, further comprising first and second platforms arranged, respectively, adjacent said first and second positions.

9. An apparatus according to claim 5, further comprising first transfer means, arranged between said turntable and said first platform, and second transfer means, arranged between said turntable and said second platform, said first and second transfer means being arranged to transfer the article from said turntable to said first and second platforms, respectively.

10. An apparatus according to claim 6, further comprising first transfer means, arranged between said turntable and said first platform, and second transfer means, arranged between said turntable and said second platform, said first and second transfer means being arranged to transfer the article from said turntable to said first and second platforms, respectively.

11. An apparatus according to claim 7, further comprising first transfer means, arranged between said turntable and said first platform, and second transfer means, arranged between said turntable and said second platform, said first and second transfer means being arranged to transfer the article from said turntable to said first and second platforms, respectively.

12. An apparatus according to claim 8, further comprising first transfer means, arranged between said turntable and said first platform, and second transfer means, arranged between said turntable and said second platform, said first and second transfer means being arranged to transfer the article from said turntable to said first and second platforms, respectively.

13. An apparatus according to claim 9, in which said first and second transfer means each comprise at least one driven roller.

14. An apparatus according to claim 10, in which said first and second transfer means each comprise at least one driven roller.

15. An apparatus according to claim 11, in which said first and second transfer means each comprise at least one driven roller.

16. An apparatus according to claim 12, in which said first and second transfer means each comprise at least one driven roller.

17. An apparatus according to claim 1, further comprising a controller for receiving the command and sending a signal to said motor to cause said motor to rotate said turntable.

18. An apparatus according to claim 2, further comprising a controller for receiving the command and sending a signal to said motor to cause said motor to rotate said turntable.

19. An apparatus according to claim 3, further comprising a controller for receiving the command and sending a signal to said motor to cause said motor to rotate said turntable.

20. An apparatus according to claim 4, further comprising a controller for receiving the command and sending a signal to said motor to cause said motor to rotate said turntable.

21. An apparatus according to claim 5, further comprising a controller for receiving the command and sending a signal to said motor to cause said motor to rotate said turntable.

22. An apparatus according to claim 9, further comprising a controller for receiving the command and sending a signal to said motor to cause said motor to rotate said turntable.

23. An apparatus according to claim 13, further comprising a controller for receiving the command and sending a signal to said motor to cause said motor to rotate said turntable.

24. An apparatus according to claim 17, in which said controller sends a stop conveyor signal to said second conveyor to stop said second conveyor as said turntable rotates.

25. An apparatus according to claim 18, in which said controller sends a stop conveyor signal to said second conveyor to stop said second conveyor as said turntable rotates.

26. An apparatus according to claim 19, in which said controller sends a stop conveyor signal to said second conveyor to stop said second conveyor as said turntable rotates.

27. An apparatus according to claim 20, in which said controller sends a stop conveyor signal to said second conveyor to stop said second conveyor as said turntable rotates.

28. An apparatus according to claim 21, in which said controller sends a stop conveyor signal to said second conveyor to stop said second conveyor as said turntable rotates.

29. An apparatus according to claim 22, in which said controller sends a stop conveyor signal to said second conveyor to stop said second conveyor as said turntable rotates.

30. An apparatus according to claim 23, in which said controller sends a stop conveyor signal to said second conveyor to stop said second conveyor as said turntable rotates.

31. An apparatus according to claim 17, further comprising a sensor arranged to sense the angular position of said turntable and to send a sensor signal indicative thereof to said controller.

32. An apparatus according to claim 24, further comprising a sensor arranged to sense the angular position of said turntable and to send a sensor signal indicative thereof to said controller.

33. An apparatus according to claim 31, in which said sensor comprises a plurality of CAM switches, operation of said CAM switches generating the said sensor signal.

34. An apparatus according to claim 32, in which said sensor comprises a plurality of CAM switches, operation of said CAM switches generating said sensor signal.

35. An apparatus according to claim 31 in which said controller sends an actuator stop signal, in dependence upon the sensor signal, to stop said actuator rotating said turntable, such that the angular direction of said turntable is selectable.

36. An apparatus according to claim 32 in which said controller sends an actuator stop signal, in dependence upon the sensor signal, to stop said actuator rotating said turntable, such that the angular direction of said turntable is selectable.

37. An apparatus according to claim 33 in which said controller sends an actuator stop signal, in dependence upon the sensor signal, to stop said actuator rotating said turntable, such that the angular direction of said turntable is selectable.

38. An apparatus according to claim 34 in which said controller sends an actuator stop signal, in dependence upon the sensor signal, to stop said actuator rotating said turntable, such that the angular direction of said turntable is selectable.

39. A sorting apparatus in accordance with claim 1, wherein said detector comprises a pair of photoelectric cells.

40. An apparatus for sorting baggage, comprising:
   a conveyor for conveying baggage from a first end to a second end thereof;
   an X-ray device arranged between said first and second ends of said conveyor;
   a turntable rotatable about an upright axis, said turntable disposed adjacent-to said second end of said conveyor to receive the baggage therefrom;
   driving means for driving the baggage across said turntable in a direction;
   a motor for rotating said turntable about said upright axis between first and second angular positions in response to a command, such that the baggage is moved off said turntable by said driving means and onto a first member arranged in said first angular direction or onto a second member arranged in said second angular direction depending upon whether said turntable is in said first angular position or said second angular position, respectively;
   a detector detecting if the baggage disposed on said turntable exceeds a selected length; and
   a disabler disabling said conveyor in response to said detector when the baggage disposed on said turntable exceeds the selected length.

41. An apparatus according to claim 40 in which said X-ray device generates an X-ray image of the baggage, said image prompting a user to send the command to said motor, such that the baggage may be selectively moved onto said first or second members.

42. A sorting apparatus in accordance with claim 40, wherein said detector comprises a pair of photoelectric cells.

43. A method for sorting articles comprising:
   scanning a plurality of articles with an X-ray device;
   conveying the plurality of articles to a turntable;

separating the plurality of articles by conveying a first quantity of articles to a first member through rotation of the turntable through a first angle, and driving each article onto said first member, and by conveying a second plurality of articles to a second member through rotation of the turntable through a second angle, and driving each article onto said second member; detecting if an article disposed on the turntable exceeds a selected length; and disabling said conveying in response to said detecting.

44. A method of sorting articles, comprising the steps of:

conveying a plurality of articles to a turntable;

examining the plurality of articles with an X-ray device for the presence or absence of a condition; and separating the plurality of articles based upon the presence or absence of the condition by:
- conveying a first quantity of the plurality of articles exhibiting the condition to a first member through rotation of the turntable through a first angle;
- driving each said article of the second plurality onto a second member;
- detecting when an article disposed on the turntable exceeds a selected length; and
- disabling the conveying of articles to the turntable in response to said detecting.

45. An X-ray system comprising:

a feeder accepting a plurality of articles;

an X-ray machine arranged to receive articles from said feeder for detection of a characteristic of interest, said X-ray machine displaying said detection of said characteristic of interest of said plurality of articles onto a screen;

a conveyor arranged to receive article from said, X-ray machine for moving said plurality of articles out of said X-ray machine and onto a turntable;

said turntable attached to receive from said conveyor for separating said plurality of articles onto two different members based upon said detection of said characteristic of interest, wherein said turntable is controlled by manual interaction of an operator looking at said screen or by automatic detection of said characteristic of interest of said plurality of articles by said X-ray machine;

a detector detecting when an article disposed on said turntable exceed a selected length; and a disabler disabling said conveyor in response to said detector detecting an article of excess length.

46. A sorting apparatus in accordance with claim 45, wherein said detector comprises a pair of photoelectric cells.

* * * * *